US006542727B1

(12) United States Patent
Kikuchi

(10) Patent No.: US 6,542,727 B1
(45) Date of Patent: Apr. 1, 2003

(54) RECEIVING CONTROL APPARATUS AND METHOD THEREOF

(75) Inventor: Tetsuya Kikuchi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/383,575

(22) Filed: Aug. 25, 1999

(30) Foreign Application Priority Data

Feb. 19, 1999 (JP) .......................... 11-041160

(51) Int. Cl.[7] ................................ H04B 1/16
(52) U.S. Cl. ................. 455/343; 455/574; 370/311; 340/7.33
(58) Field of Search ................ 455/230, 231, 455/343, 574; 370/311; 340/7.32, 7.33, 7.34, 7.38, 7.39

(56) References Cited

U.S. PATENT DOCUMENTS 5,592,173 A * 1/1997 Lau et al. ............... 455/343
5,943,613 A * 8/1999 Wendelrup et al. ....... 455/343
5,987,339 A * 11/1999 Asano ...................... 455/574
6,243,597 B1 * 6/2001 Daanen .................... 455/574

FOREIGN PATENT DOCUMENTS

| JP | 62-26941 | 2/1987 |
| JP | 9-113654 | 5/1997 |
| JP | 10-94019 | 4/1998 |

* cited by examiner

Primary Examiner—William Trost
Assistant Examiner—Simon Nguyen
(74) Attorney, Agent, or Firm—Katten Muchin Zavis Rosenman

(57) ABSTRACT

A time clock oscillator is continually operated to drive an MMI (Man-Machine Interface) unit. Although a TCXO provides a high-accuracy clock signal to accurately receive signals, the power consumption is large. Therefore, during receiving standby only a time clock oscillator is operated, and the TCXO is stopped. Then, timing prior to the reception of signals based on the time clock signal is obtained, and the TCXO is started. Although both the MMI unit and a timing processing unit are driven by the time clock signal before the TCXO is started, after the TCXO is started both a wireless processing unit and the timing process unit are started based on a master clock signal from the TCXO. Then, signals are received based on the master clock signal.

6 Claims, 13 Drawing Sheets

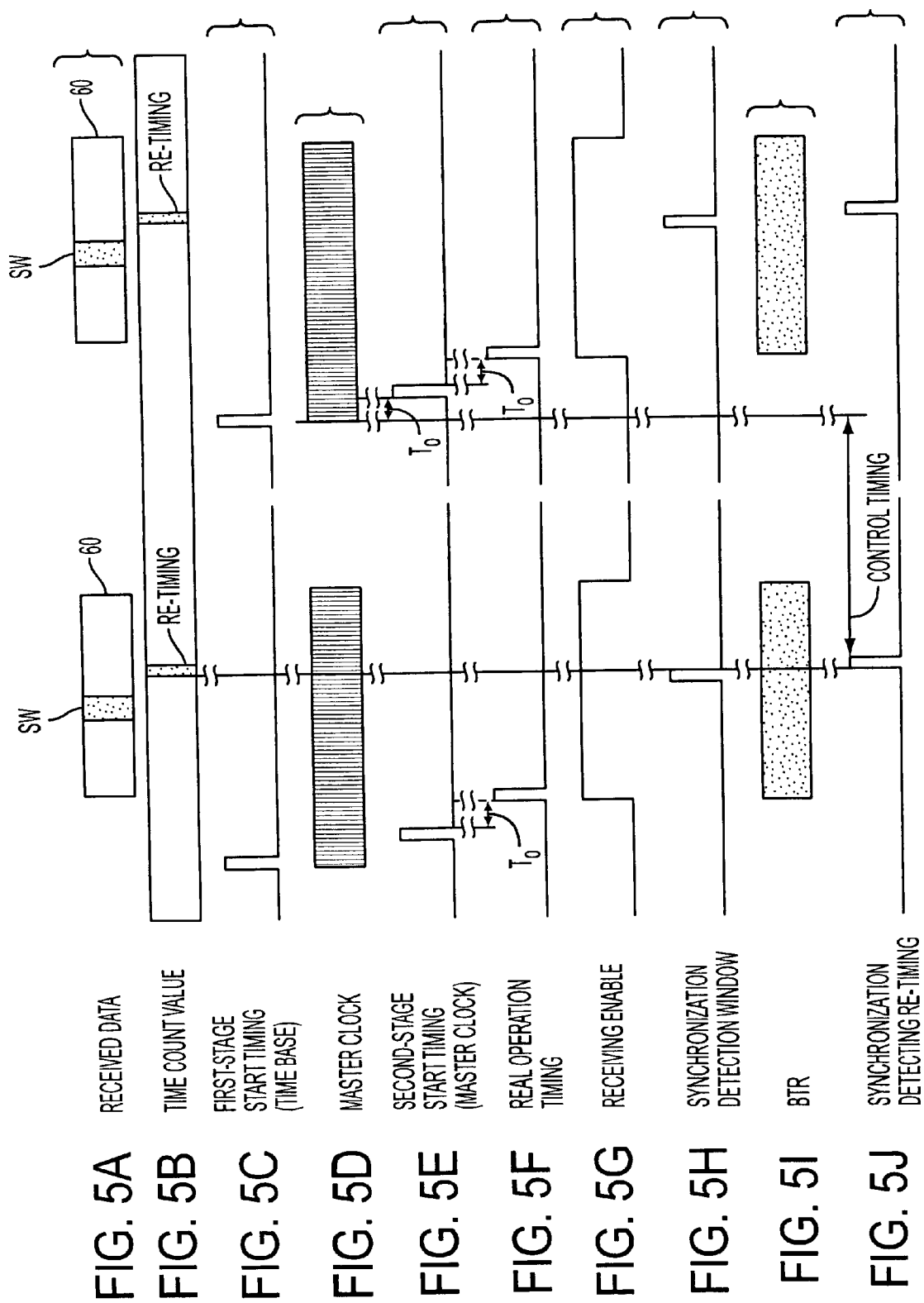

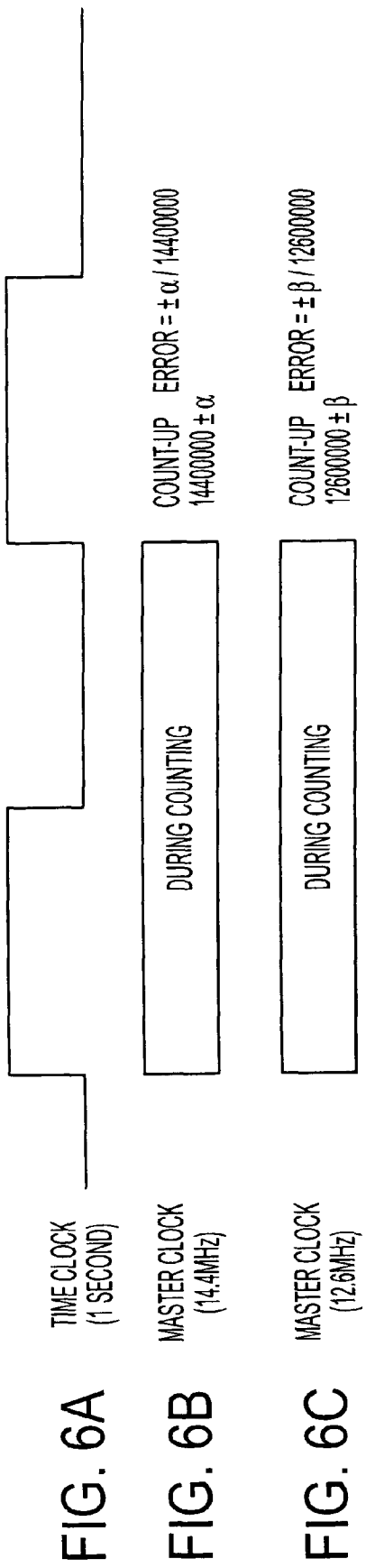

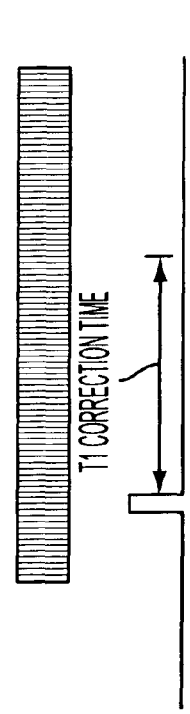
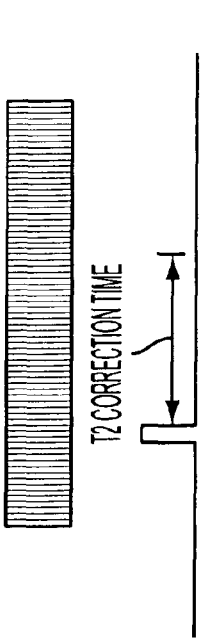
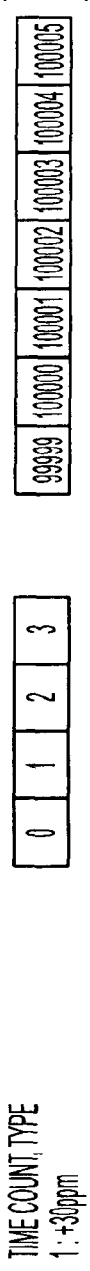
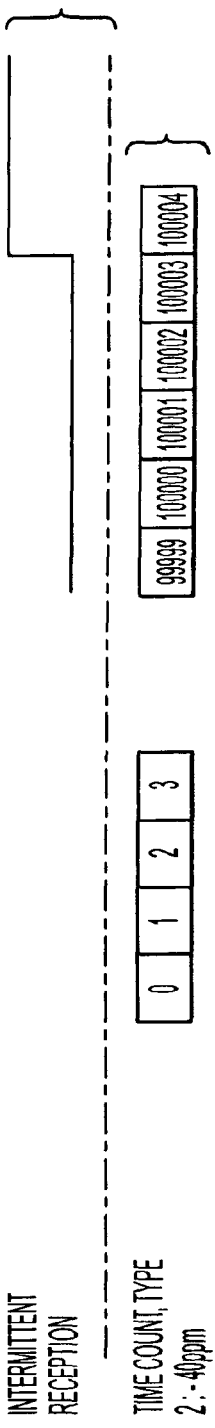
FIG. 7A  SYNCHRONIZATION DETECTION
FIG. 7B  TIME COUNT, TYPE 1: +30ppm
FIG. 7C  MASTER CLOCK OSCILLATION (FIRST-STAGE START TIMING)
FIG. 7D  SECOND-STAGE START TIMING
FIG. 7E  INTERMITTENT RECEPTION
FIG. 7F  TIME COUNT, TYPE 2: −40ppm
FIG. 7G  MASTER CLOCK OSCILLATION (FIRST-STAGE START TIMING)
FIG. 7H  SECOND-STAGE START TIMING
FIG. 7I  INTERMITTENT RECEPTION

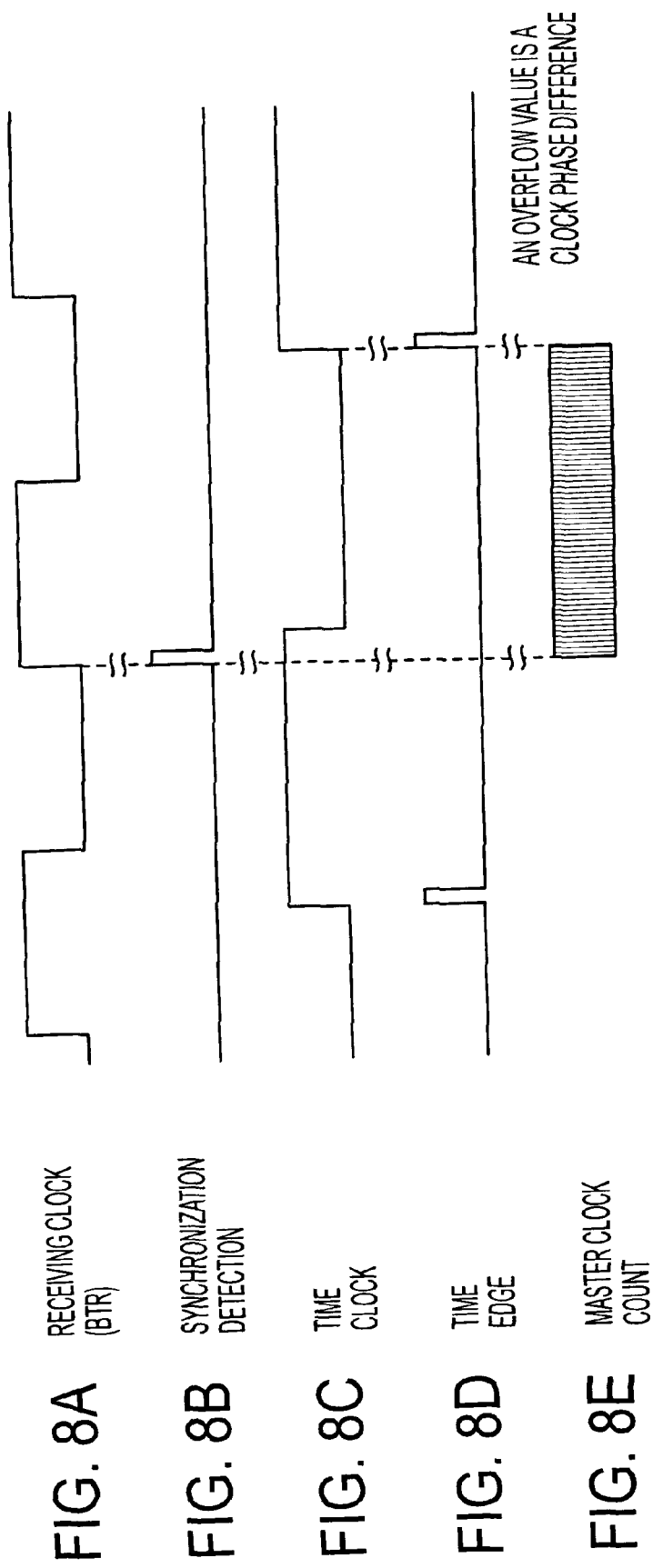

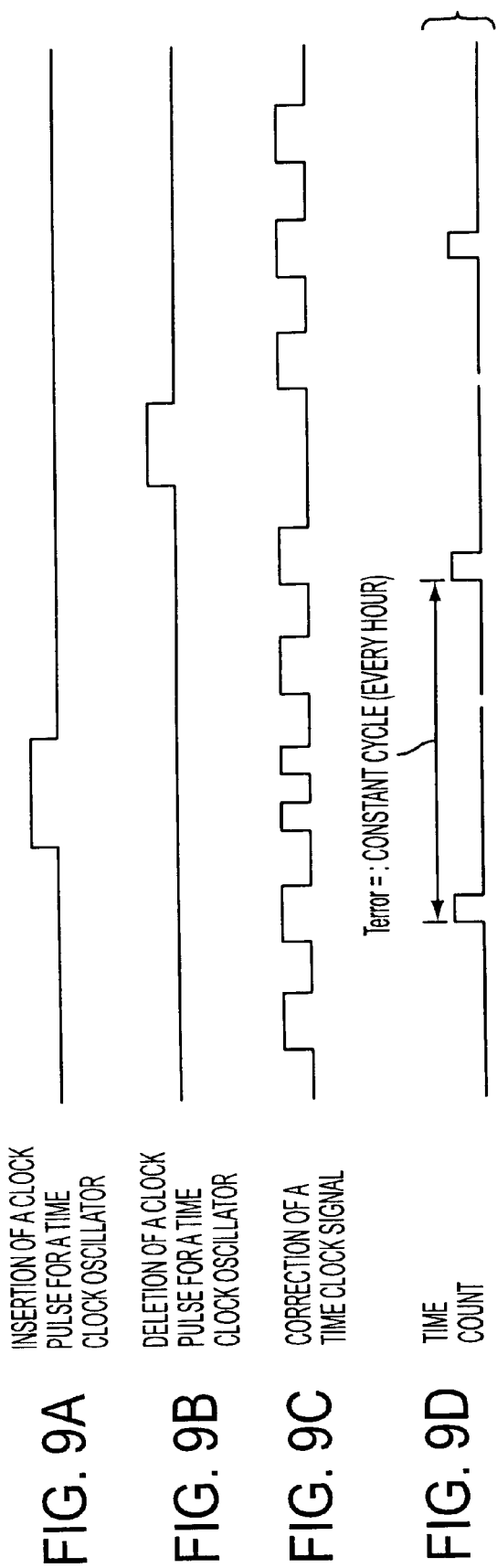

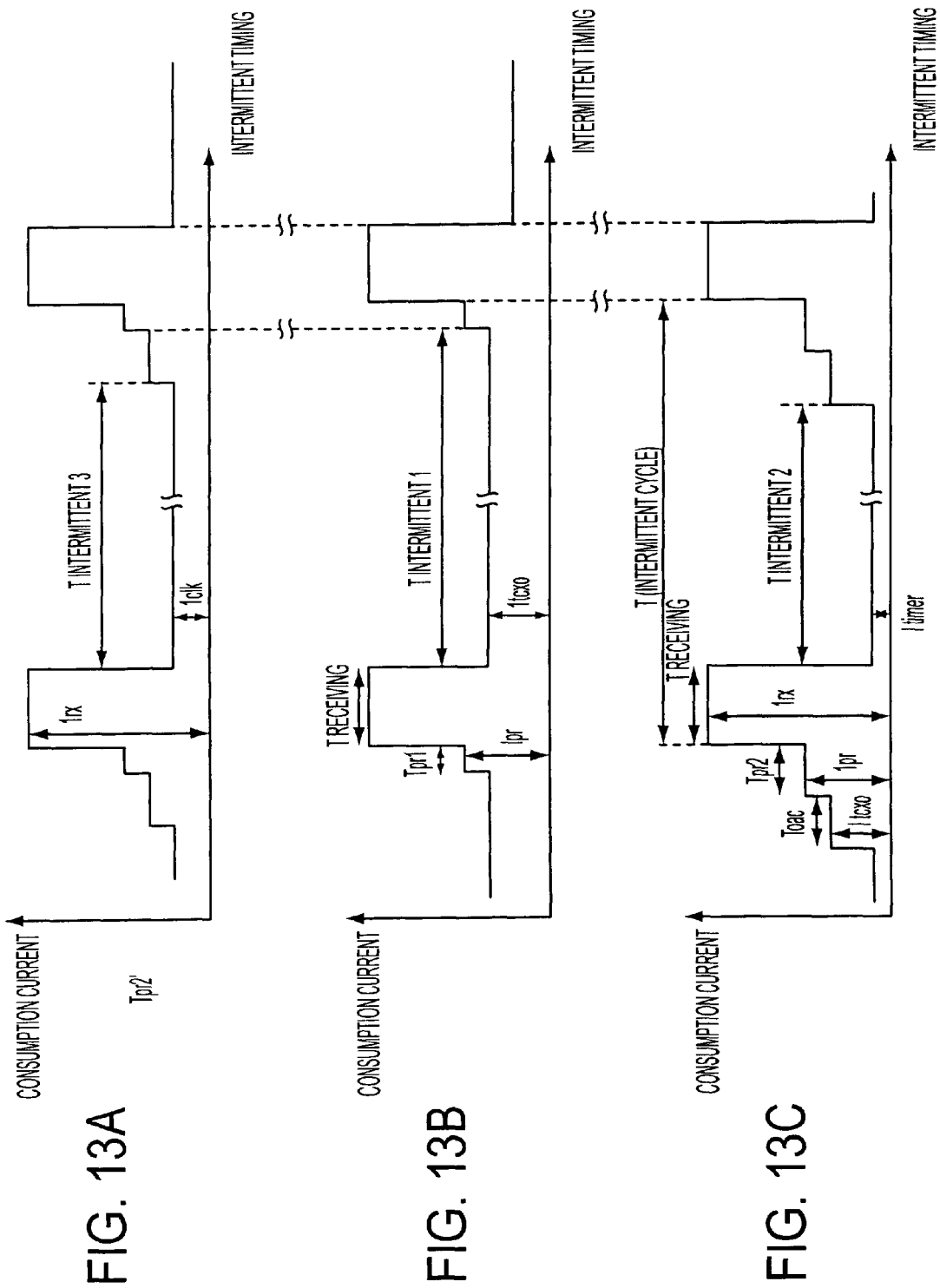

RECEIVING CONTROL APPARATUS AND METHOD THEREOF

BACKGROUND OF THE INVENTION

1. Field of the Invention

The present invention relates to a wireless communication apparatus and the receiving control method thereof.

2. Description of the Related Art

Generally, in a digital cellular phone, the improvement in time resolution in a BB (baseband) signal process and the reduction of the number of components are targeted, and as shown in FIG. 13, a master clock used in the BB process is supplied from a TCXO (temperature compensation crystal oscillator) 1401, which is the reference frequency oscillator of a wireless processing unit 1400.

Since during normal communications in this system, clock jitters in the BB signal process are reduced, transmitting and receiving performance is improved.

However, also during intermittent receiving standby, a reference clock oscillator 1403 requiring relatively large current has been operated, and the timing control of intermittent reception has been exercised using a high-accuracy clock signal as a reference frequency.

FIG. 1 outlines the use mode of a clock signal of a conventional cellular phone.

First, the wireless processing unit 1400 reproduces the carrier of a received signal, and converts the RF (Radio Frequency) signal to an IF (Intermediate Frequency) band or baseband signal. In this configuration, since no sufficiently accurate reproduction of the carrier causes a great degradation in the amplitude of the IF band or baseband signal, the reproduction of the carrier is performed using a clock signal generated by the highest-accuracy TCXO 1401 as a master clock signal.

However, a timing process unit 1402 extracts binary-coded data from the amplitude of the baseband signal converted by the wireless processing unit 1400. The timing process unit 1402 is operated in two ways: in one way, the frequency of a clock signal from the TCXO 1401 is divided and one of the divided frequencies is used to operate the timing process unit 1402, and in the other way, a reference clock signal (reference clock oscillating circuit) 1403 is provided in addition to the TCXO 1401 and the timing process unit 1402 is operated using the reference frequency. If the timing process unit 1402 is operated by using the divided frequency of a clock signal of the TCXO 1401, the TCXO 1401 must be driven even when there are no actual communications. In this case, since the TCXO 1401 has a high accuracy and requires a large amount of power, the power is wasted if the TCXO 1401 is operated during receiving standby (period in which no signals are being received, but an apparatus is ready to receive signals at any time). For this reason, in some conventional cellular phones, the operation of the TCXO 1401 is stopped during receiving standby, and the timing process unit 1402 is driven -using the reference clock signal 1402 separately provided and which has a lower accuracy, but requires a smaller amount of power than the TCXO 1401.

An MMI (Man-Machine Interface) unit 1404 displays characters on the display of a cellular phone, and is driven by a time clock signal (time clock oscillating circuit) 1405 which has a lower accuracy than both the TCXO 1401 and reference clock signal 1403. Since this MMI unit 1404 must also always be ready to respond to a user operation and display the time on the display, the MMI unit 1404 is driven by the time clock oscillating circuit 1405 which is always operated. Since the time clock signal 1405 has a lower accuracy than both the TCXO 1401 and reference clock signal 1403, but the smallest power consumption of the three units, the receiving standby time of a cellular phone is not reduced even if the time clock oscillating circuit 1405 is always operated.

Regardless of a system, such as a PHS (Personal Handyphone System), PDC (Personal Digital Cellular) system, CDMA (Code Division Multiple Access) system, etc., a large burden is imposed on the receiving standby time in a performance comparison between cellular phones.

However, since weight/size is also a major factor in the performance comparison between cellular phones, receiving standby time cannot be freely increased by increasing the battery capacity.

In a TDMA (Time Division Multiple Access) system, the higher the accuracy of the reference clock signal 1403 during a BB signal process, the more the frequency at which jitters occur is reduced during BTR (reproduction of a receiving clock signal). Therefore, the TDMA system has a theoretical advantage over other systems in transmitting and receiving characteristics. Since the adoption of a reference clock signal 1403 has a certain degree of an effect on the improvement in performance regardless of the fluctuation in performance of components, etc., the adoption of a reference clock signal is a very effective means for improving the overall performance of mass-produced cellular phones.

If a reference clock oscillating circuit 1403 is provided separately, the receiving characteristic can be improved. However, in this case, the reference clock oscillating circuit 1403 requires a larger amount of power than a time clock oscillating circuit 1405. Thus, a cellular phone which consumes a small amount of power and has a long receiving standby time is desired.

SUMMARY OF THE INVENTION

An object of the present invention is to provide a cellular phone with a configuration to reduce the power consumption during intermittent receiving standby.

The receiving control apparatus of the present invention comprises a reference frequency oscillator (TCXO) for generating a first high-accuracy clock signal, a time clock oscillator for generating a second clock signal which has a lower accuracy than a clock signal generated by the reference frequency oscillator, with smaller power consumption than the reference frequency oscillator, a receiving unit for receiving transmitted signals and a control unit for controlling the apparatus so as to receive signals by driving the receiving unit based on the first signal generated by the reference frequency oscillator during normal communications, so as to stop the master clock unit and to manage/control intermittent receiving timing based on the second clock signal generated by the time clock signal during receiving standby, so as to start the reference frequency oscillator based on the second clock signal generated by the time clock oscillator when the apparatus shifts from a receiving standby state to a communications state, and to make the receiving unit start receiving signals after the operation of the reference frequency oscillator is stabilized.

The receiving control method of the present invention comprises the steps of (a) generating a first high-accuracy clock signal, (b) generating a second clock signal which has a lower accuracy than the clock signal generated in step (a), with smaller power consumption than that used in step (a), (c) receiving transmitted signals, and (d) controlling the apparatus so as to receive signals in step (c) based on the first clock signal generated in step (a) during normal communications, so as to stop the generation of the first clock signal in step (a) and to manage/control intermittent receiving timing based on the second clock signal generated in step (b) during receiving standby, so as to start the process in step (a) based on the second clock signal generated in step (b) when the apparatus shifts from a receiving standby state to a communications state, and so as to start the reception of signals in step (c) after the operation in step (a) is stabilized.

According to the present invention, since during receiving standby only the time clock oscillator is operated and the reference frequency oscillator for outputting a high-accuracy clock signal is not operated, the power consumption can be reduced. When data are received, the signal accuracy the same as that in the case where signals are received while the reference frequency oscillator is operated, can be received since the reference frequency oscillator is started based on the count value of the second clock signal outputted from the time clock signal and signals are received based on the high-accuracy clock signal generated by the reference frequency oscillator prior to reception.

In another aspect of the present invention, the apparatus comprises means for storing both the detected value of the frequency deviation against the first clock signal generated by the reference frequency oscillator of the second clock signal generated by the time clock oscillator and the phase difference value between a receiving clock signal extracted by the received data and the second clock signal generated by the time clock oscillator, and timing started by the reference frequency oscillator is adjusted taking into consideration the stored frequency deviation and phase difference. Therefore, the correct reception of data can be guaranteed and the apparatus can be controlled in such a way that the power is not wasted by starting the reference frequency oscillator too early.

BRIEF DESCRIPTION OF THE DRAWINGS

FIGS. 5A through 5J are timing charts showing the entire intermittent receiving timing controlling process of a preferred embodiment of the present invention.

FIGS. 6A through 6C are timing charts showing the summary of a frequency deviation measuring operation.

FIGS. 7A through 7I are timing charts showing the summary of the correcting method of start timing.

FIGS. 8A through 8E explain the measuring method of the phase difference between a time clock signal and a BTR clock signal.

FIGS. 9A through 9D are timing charts showing a method for improving the apparent accuracy of a clock timer.

FIGS. 13A through 13C show the difference in consumption currents between a conventional clock configuration and the clock configuration of a preferred embodiment of the present invention.

DESCRIPTION OF THE PREFERRED EMBODIMENTS

Figure 1:
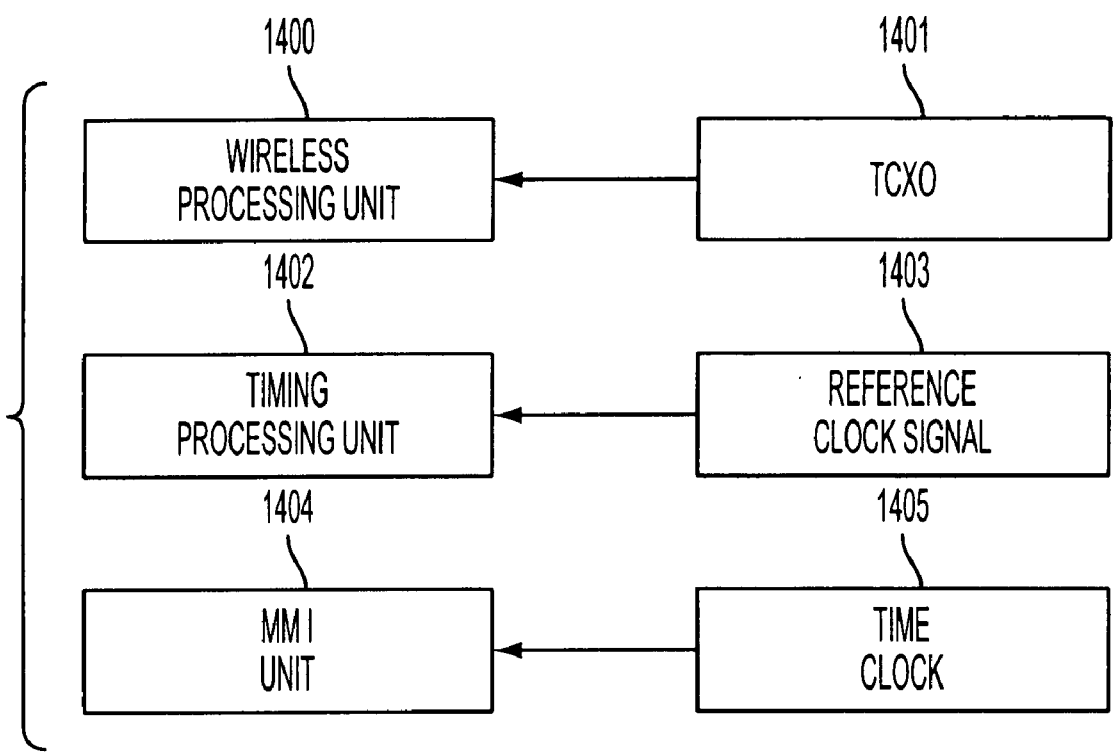
FIG. 1 roughly shows the use mode of a clock signal of a conventional cellular phone.
Figure 2:
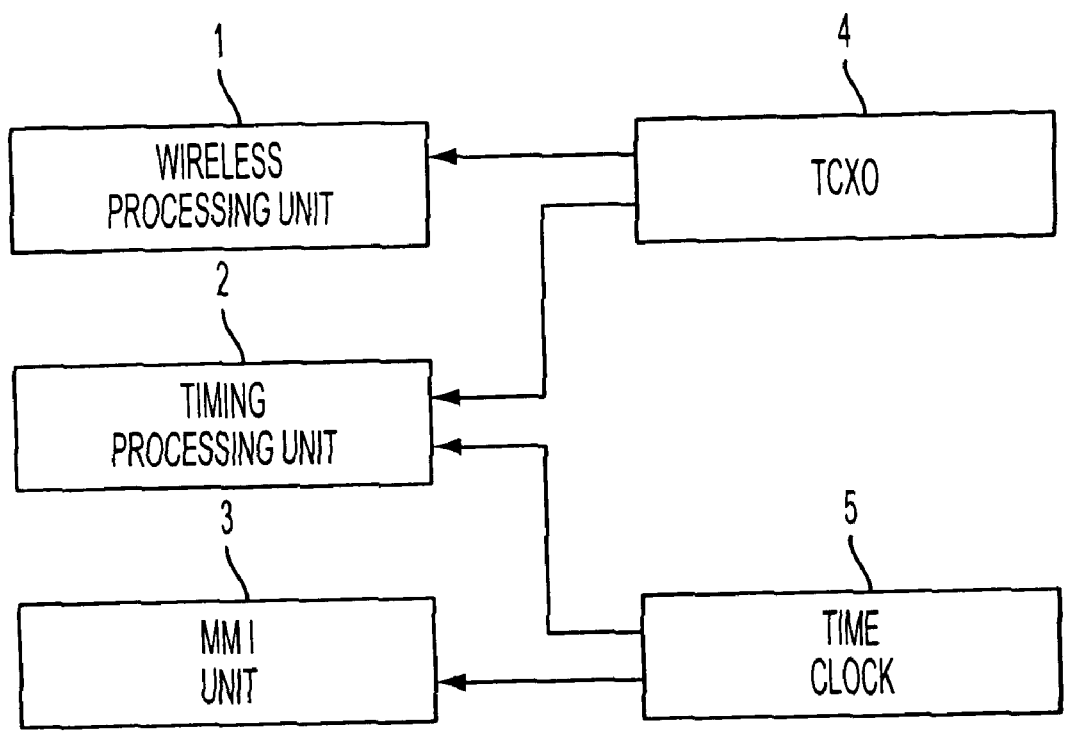
FIG. 2 shows the basic configuration of the present invention.

FIG. 2 shows the basic configuration of the present invention.

When being operated, in the same way as a conventional system, a wireless processing unit 1 reproduces a carrier using a TCXO 4 as a reference frequency oscillator, and converts RF signals to IF or baseband signals. This is done to maintain receiving accuracy. An MMI unit 3 is supplied with clock signals by a time clock oscillator 5 which is always in operation, and is prepared to receive signals even during receiving standby. A timing process unit 2 is supplied with clock signals by the time clock oscillator 5 and operated to receive signals during receiving standby. If signals are received, the supply source of clock signals is switched to the TCXO 4, which enables high-accuracy reception.

By removing a conventional reference clock signal, only a time clock oscillator 5 is operated during receiving standby. In this way, the power consumption can be reduced and receiving standby time can be increased.

Figure 3:
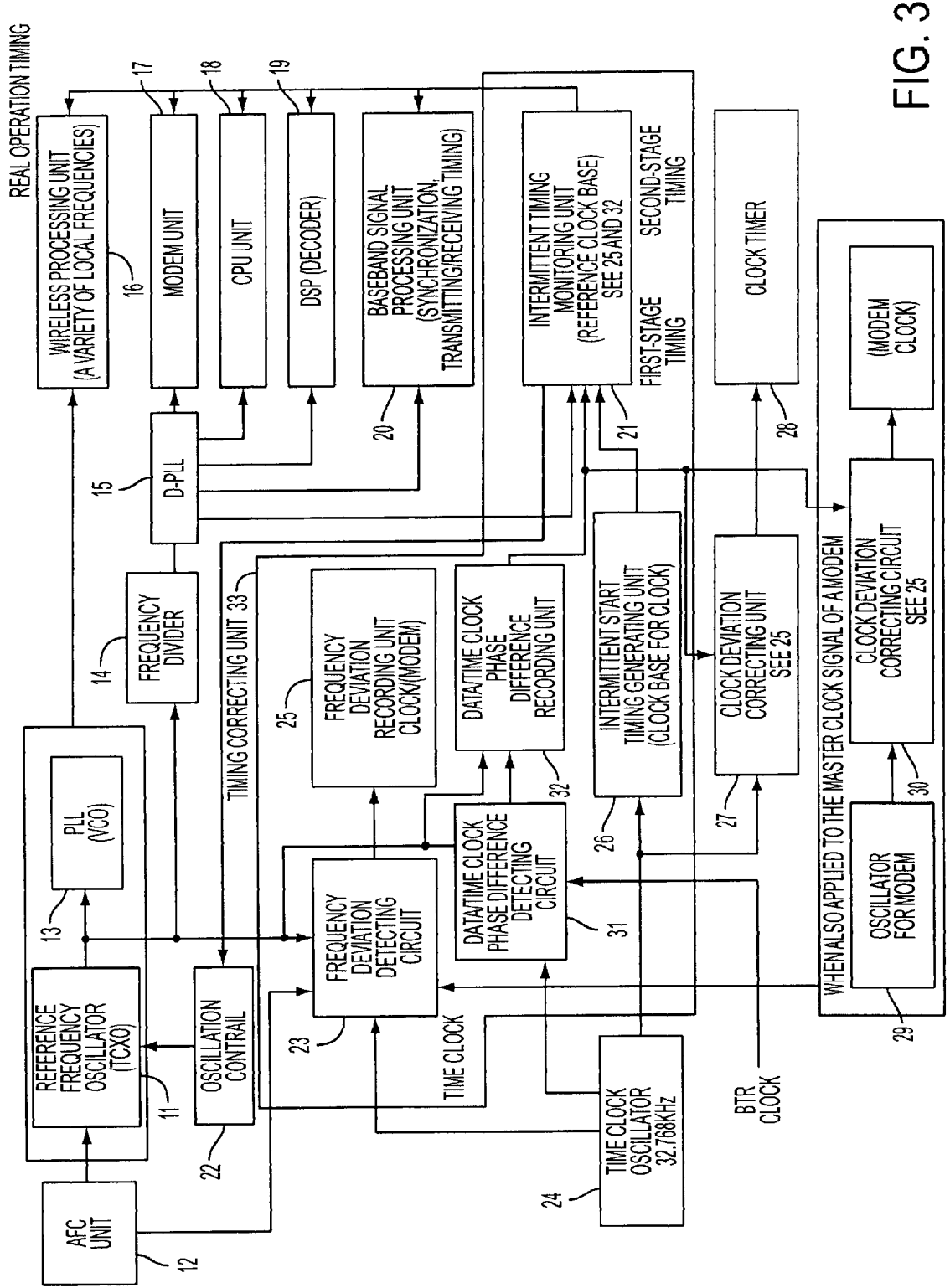
FIG. 3 shows the configuration of a preferred embodiment of the present invention.

FIG. 3 shows the configuration of a preferred embodiment of the present invention.

In this preferred embodiment and in the same way as a conventional system, during normal communications (except during intermittent receiving standby) clock signals are generated in a circuit block (for example, 17, 18 or 19) other than the reference frequency oscillator (TCXO) 11 of the wireless processing unit based on clock signals generated by the reference frequency oscillator (TCXO) 11 of the wireless processing unit, and distributed to each block. Since according to the configuration described above, clock jitters are reduced, the performance in the BB process of the present invention is the same as that of a conventional system.

However, since a master or reference clock signal which was outputted from the TCXO 11 was also referenced (used) as a reference timing signal during receiving standby, the reference frequency oscillator 11 or reference clock oscillator could not be stopped during receiving standby.

In a cellular phone, while the transmitting/receiving unit is transmitting or receiving signals, it is theoretically impossible to stop the TCXO 11, and while the wireless processing unit is stopped for a relatively long time, for example, while signals are not received during intermittent receiving standby, it is very inefficient from the viewpoint of power consumption for the TCXO 11 to continue to oscillate.

Thus, as shown in FIG. 3, this preferred embodiment comprises an oscillation control block 22 for controlling the oscillation of the TCXO 11, a frequency deviation detector circuit 23 for detecting the frequency deviation of a clock signal of a time clock oscillator 24 based on clock signals from the time clock oscillator 24, an intermittent start timing generating unit 26 for generating first-stage start timing signals during intermittent reception and an intermittent timing monitoring unit 21 for receiving the first-stage start timing signals, generating second-stage timing signals based on clock signals from the TCXO 11, providing specific off-set signals together with the second-stage timing signals and generating real operation timing signals for a wireless processing unit 16, modem unit 17, CPU unit 18, DSP 19 and baseband signal processing unit 20.

The interval between the first-stage start timing signal and the second-stage start timing signal can be changed based on data stored in a frequency deviation recording unit 25.

Although the error of a clock timer 28 is generally corrected according to such a configuration, in this preferred embodiment, in order to minimize the error the intermittent start timing generating unit 26 is re-started in synchronization with the detection to prevent the error from accumulating, and the simultaneous phase difference between a receiving clock signal and a time clock signal at the time of synchronization confirmation is utilized together with the clock deviation as correction information used in the intermittent timing monitoring unit 21 by adding a function to count/store the phase deviation based on a master clock signal from the TCXO 11. In this way, during receiving standby the TCXO 11 can be stopped and a time clock signal (clock of the time clock oscillator 24), rather than the master clock signal, can be referenced.

Since an intermittent receiving control signal to be distributed to each unit is generated based on a high-accuracy master clock signal after an start timing signal is received, the basic performance, such as synchronization protection, etc. is not affected.

Although generally speaking, a cellular phone is provided with both a reference frequency oscillator for generating radio carriers and a time clock oscillator, their objectives are completely different and cannot be commonly used.

This is because the master clock signal must be highly accurate, whereas the consumption current of the time clock signal must be very low.

In this preferred embodiment, in order to reduce the power consumption during receiving standby, intermittent timing signals used during receiving standby are generated by using a time clock signal that requires a small current.

However, the time clock oscillator 24 has a low accuracy and the fluctuation in performance quality cannot be ignored. For this reason, the clock signal of the time clock oscillator 24 cannot be used for high-accuracy time division control as it is. When a real control timing signal is generated, the clock signal must be corrected based on the deviation value which is measured using a high-accuracy clock signal supplied from the reference frequency oscillator 11. The frequency of a time clock signal is low, and as a result, the time resolution of a time clock signal is low, against which some countermeasures are applied.

In FIG. 3, the starting/stopping of the reference frequency oscillator (TCXO) 11 is controlled by an oscillation control unit 22. If the TCXO 11 is started, an automatic frequency control (AFC) unit 12 controls the TCXO 11 in such a way that the reference frequency of a master clock signal generated by the TCXO 11 can be maintained constant. The master clock signal outputted from the TCXO 11 is inputted to a PLL 13. The PLL 13 includes an oscillator (VCO), and after synchronizing the phase of a clock signal generated from this VCO with the phase of the master clock signal outputted from the TCXO 11, it outputs the clock signal to the wireless processing unit 16. Then, the wireless processing unit 16 reproduces a carrier and converts RF signals to IF or baseband signals.

The master clock signal oscillated from the TCXO 11 is divided by a frequency divider 14 and the divided master clock signals are inputted to a D-PLL 15. If the phase of the clock signal outputted from the frequency divider 14 deviates from a specific range, the D-PLL 15 controls the phase of the clock signal by adjusting the count value. The clock signals outputted from the D-PLL 15 are inputted to the modem unit 17, CPU unit 18, DSP 19 and baseband signal processing unit 20, and in each unit, received RF signals are processed based on the clock signal. The clock signal outputted from the D-PLL 15 is also inputted to the intermittent timing monitoring unit 21.

Although the accuracy of the clock signal outputted from the time clock oscillator 24 is low, only the time clock oscillator 24 is operated while the TCXO 11 is not operated. Therefore, when an intermittent reception is carried out, the TCXO 11 must be started based on the clock signal outputted from the time clock oscillator 24, and accurate reception must be carried out. The clock signal outputted from the time clock oscillator 24 is inputted to the frequency deviation detecting circuit 23, and the deviation in frequency between the clock signal outputted from the time clock oscillator 24 and the master clock signal inputted from the TCXO 11 is detected. This detection result is recorded in the frequency deviation recording unit 25.

The clock signal outputted from the time clock oscillator 24 is also inputted to a clock deviation correcting circuit 27. The clock deviation correcting circuit 27 obtains a frequency deviation value recorded in the frequency deviation recording unit 25, corrects the frequency of the clock signal inputted from the time clock oscillator 24 and outputs the corrected clock signal to the clock timer 28. The clock timer 28 operates accurately in such a way.

The clock signal outputted from the time clock oscillator 24 is also inputted to the intermittent start timing generating unit 26. The intermittent start timing generating unit 26 generates a first-stage timing signal for starting the TCXO 11 using the clock signal inputted from the time clock oscillator 24. This first-stage timing signal is inputted to the intermittent timing monitoring unit 21. The intermittent timing monitoring unit 21 reads the frequency deviation of the time clock oscillator 24 and the phase difference between data and time clock from the frequency deviation recording unit 25 and a data/time clock phase difference recording unit 32, respectively, and outputs a second-stage timing signal for instructing the oscillation control unit 22 as to when the TCXO 11 should be started. In this way, the TCXO 11 is started by the oscillation control unit 22. If the TCXO 11 is started, a high-accuracy master clock signal outputted from the TCXO 11 is inputted to the frequency divider 14. After being divided by the frequency divider 14, the master clock signal of the TCXO 11 is inputted to the D-PLL 15. The clock signal of which the phase is adjusted by the D-PLL 15 is inputted to the intermittent timing monitoring unit 21. The intermittent timing monitoring unit 21 provides the wireless processing unit 16, modem unit 17, CPU unit 18, DSP 19 and baseband signal processing unit 20 with a real operation timing signal. The moment the intermittent reception is completed, the intermittent timing monitoring 21 controls the TCXO 11 so it stops via the oscillation control unit 22.

The moment the AFC unit 12 is operated, the frequency deviation detecting circuit 23 is started. If the frequency deviation between the master clock signal inputted from the TCXO 11 and the clock signal inputted from the time clock oscillator 24 is detected, the frequency deviation detecting circuit 23 updates a frequency deviation value to be recorded in the frequency deviation recording unit 25. The moment the AFC unit 12 stops, the frequency deviation detecting circuit 23 stops. In this way, every time the TCXO 11 is operated for intermittent reception, the frequency deviation detecting circuit 23 measures the frequency deviation of the clock signal (time clock signal) of the time clock oscillator 24 against the master clock signal, and compensates for the secular change of the frequency deviation of the clock signal of the time clock oscillator 24 against the master clock signal, etc.

The clock signal outputted from the time clock oscillator 24, BTR clock signal (clock signal reproduced from received data) and master clock signal outputted from the TCXO 11 are inputted to the data/time clock phase difference detecting circuit 31. The data/time clock phase difference detecting circuit 31 detects the deviation value between the phase of the clock signal outputted from the time clock oscillator 24 and the phase of the BTR clock signal based on the master clock signal, and records the detected value in the data/time clock phase deviation recording unit 32. The detected value is read by the intermittent timing monitoring unit 21. This is because the detected value is designated as one of the factors for adjusting the start-up timing of the TCXO 11, taking into consideration the fact that the phase difference gradually varies since the frequency of the clock signal is generated by the time clock oscillator 24 and is not a multiple of the frequency of the BTR clock signal (hereinafter called a BTR clock signal).

In this way, in this preferred embodiment, a timing correcting unit 33 which comprises the intermittent timing monitoring unit 21, frequency deviation detecting circuit 23, frequency deviation recording unit 25, intermittent start timing generating unit 26, data/time clock phase detecting unit 31 and data/time clock phase recording unit 32, detects the frequency deviation and phase deviation of a time clock signal, and adjusts the timing for starting the TCXO 11 using these deviations.

This preferred embodiment can be applied not only to the time oscillator 24 but also to a modem oscillator 29. Specifically, a clock signal oscillated by the modem oscillator 29 is inputted to the frequency deviation detecting circuit 23, the deviation in frequency between this clock signal and the master clock signal outputted from the TCXO 11 is obtained and the deviation in frequency is recorded in the frequency deviation recording unit 25. A clock deviation correcting circuit 30 for inputting the clock signal outputted from the modem oscillator 29 obtains both a frequency deviation value between the clock signal and the modem oscillator 29, and the master clock signal stored in the frequency deviation recording unit 25, corrects the frequency deviation of the clock signal of the modem oscillator 29 using the frequency deviation value, and outputs the clock signal obtained by this correction to the modem unit 17 as a modem clock signal.

Figure 4:
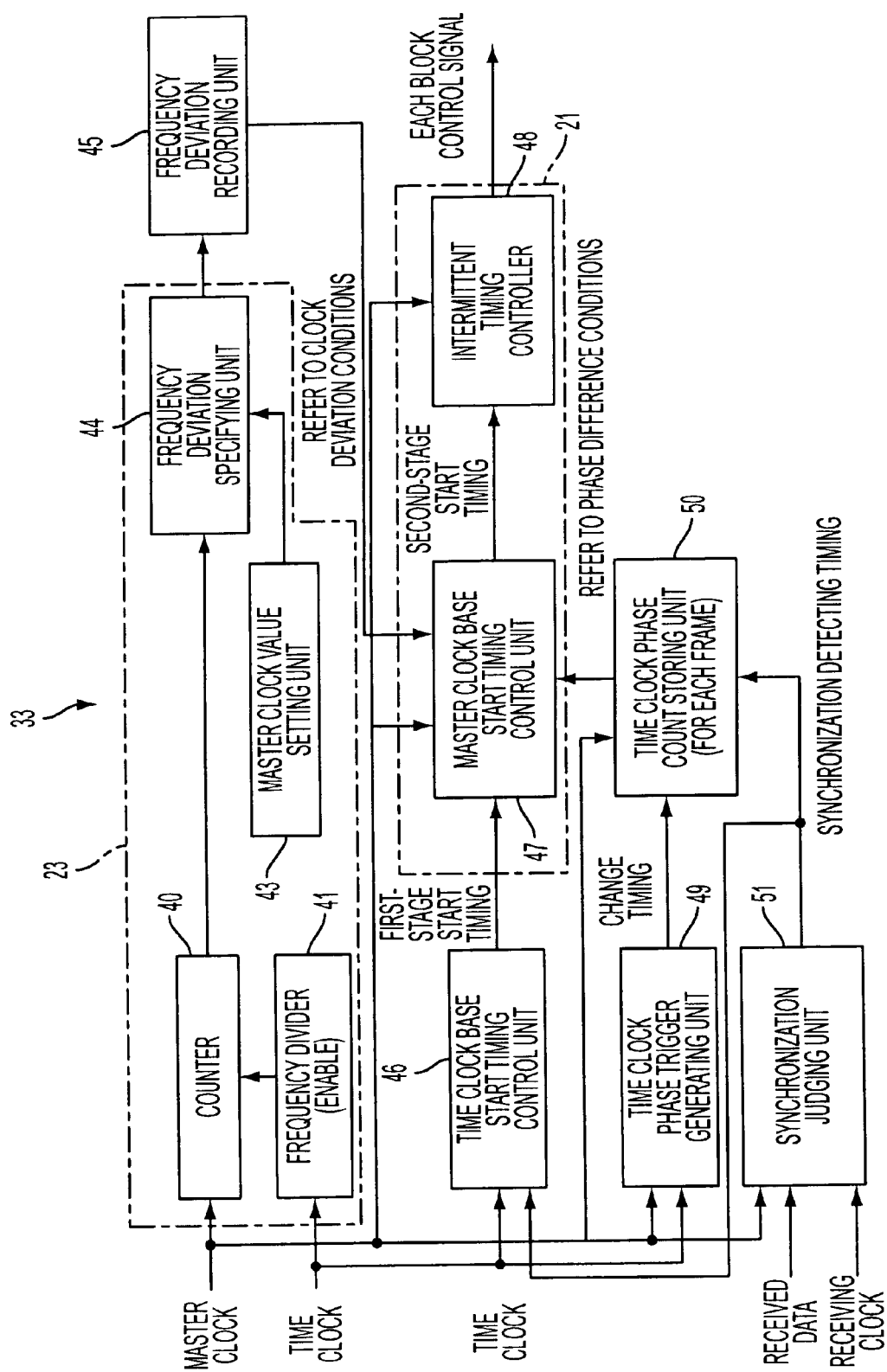
FIG. 4 shows the detailed block configuration of the timing correction unit 33 shown in FIG. 3.

FIG. 4 shows the detailed block configuration of the timing correcting unit 33 shown in FIG. 3.

A counter 40, frequency divider 41, frequency deviation specifying unit 44 and master clock value setting unit 43 shown in FIG. 4 composes the frequency deviation detector circuit 23 shown in FIG. 2. A master clock signal is inputted to the counter 40 from the TCXO 11 and a time clock signal is simultaneously inputted as an enable signal. The counter 40 counts the input pulses of the master clock signal. However, since the enable signal is one of the divided signals of the time clock signal, as described above, the counter 40 outputs a counter value in a cycle of the enable signal. This count value is the number of pulses of the master clock signal counted by the counter 40 during one cycle of the enable signal. This count value is inputted to the frequency deviation specifying unit 44. The frequency of the master clock signal is also inputted to the frequency deviation specifying unit 44 from the master clock value setting unit 43. Since the enable signal is obtained by dividing a time clock signal, the number of pulses of the master clock signal generated while a predetermined number of pulses of the time clock signal are outputted is indicated by the count value of the counter 40. If this counter value is divided by a frequency set in the master clock value setting unit 43, the time required for a cycle of the enable signal can be obtained. The frequency deviation specifying unit 44 calculates the degree of which the frequency of the time clock signal deviates from the frequency of the master clock signal per unit of time based on the time required for a cycle of the enable signal, the frequency of the master clock signal and the count value of the counter 40, and records the deviation in the frequency deviation recording unit 45 (frequency deviation recording unit 25 shown in FIG. 2).

A time clock base start timing control unit 46 in FIG. 4 corresponds to the intermittent start timing generating unit 26 shown in FIG. 3. The time clock base start timing control unit 46 outputs a first timing signal for starting intermittent reception (first-stage start timing signal) by dividing a time clock signal based on the clock timer clock. The timing of the first-stage timing signal is set such that it is a little shorter than a real intermittent timing signal, taking correcting operation in a subsequent stage into consideration. For example, if a non-reception interval is 700 ms, the timing of the first-stage timing signal is set to 695 ms and is restored to accurate timing by referring to a correction value measured 5 ms in advance and used to perform a re-synchronization establishing operation, etc.

A master clock base start timing control unit 47 and intermittent timing controller 48 shown in FIG. 4 correspond to the intermittent timing monitoring unit 21 shown in FIG. 3. The master clock base start timing control unit 47 performs a correcting operation for re-synchronization establishment, etc., and outputs a second timing signal (second-stage start timing signal) to the intermittent timing controller 48 which generates a real control timing signal for a synchronous word detection window. Since units subsequent to the intermittent timing controller 48 are operated based on a master clock signal from the TCXO 11 and are not affected by the deviation of a time clock signal, the units can perform normal receiving operation.

A count value is also inputted to the master clock base start timing control unit 47 from a time clock phase count maintaining unit 50. The time clock phase count storing unit 50 corresponds to the data/time clock phase difference recording unit 32 shown in FIG. 3. A time clock phase trigger generating unit 49 corresponds to the data/time clock phase difference detecting circuit 31 shown in FIG. 3. A master clock or time clock signal is inputted to the time clock phase trigger generating unit 49, and the time clock phase trigger generating unit 49 detects the timing change of a pulse which becomes the phase trigger of a time clock signal, such as the rising edge of a time clock signal or the falling edge of a pulse, and outputs the signal indicating the timing change to the time clock phase count storing unit 50 as a phase trigger signal. To a synchronization judging unit 51 (not shown in FIG. 3) received data, receiving clock signal reproduced from the received data and a master clock signal are inputted, the synchronization judging unit 51 detects the synchronous signal of the received data, and the synchronization judgment unit 51 inputs a synchronization detection timing signal (synchronization detection re-timing signal) to the time clock phase count storing unit 50. The time clock phase count storing unit 50 counts the number of pulses of a master clock signal generated from the point when the synchronization detection timing signal is inputted until the point the phase trigger signal of the time clock signal is inputted from the time clock phase trigger generating unit 49, and stores the counted value. This counted value indicates the phase difference between the time clock signal and the receiving clock signal. The master clock base start timing control unit 47 refers to the counted value stored in the time clock phase count storing unit 50, and judges how much the phase of the time clock signal deviates from the phase of the receiving clock signal (BTR clock signal). The master clock base start timing control unit 47 also refers to the frequency deviation recording unit 45, and determines the timing of the master clock signal to be used to start an intermittent reception.

The processes described above are executed while master clock signals are outputted from the TCXO 11, and data are written in the frequency deviation recording unit 45 and time clock phase count storing unit 50 during intermittent reception. When intermittent reception is completed, these processes are terminated, and data which are stored in the frequency deviation recording unit 45 and time clock phase count storing unit 50 are used to start the next intermittent reception.

Specifically, the clock signal from the time clock oscillator is divided at specific intervals by the frequency divider 41, and converted to an enable signal determining measurement time for the number of pulses of a master clock signal from the TCXO 11. Although a process time for measuring the frequency deviation is determined by this specific interval, real time is not required in the deviation measurement. Therefore, the interval can be arbitrarily set. For example, the interval is assumed to be 1 second here.

The number of pulses of a master clock signal, which is outputted from the TCXO 11 after control by AFC is counted by the counter 40, and the difference between the number of pulses and a counted value in the case where the deviation is "0" is stored in the frequency deviation recording unit 45. If the oscillation frequency of the TCXO 11 is 12.6 MHz, the difference is counted from 12600000. Since the accuracy of the TCXO 11 after control by AFC is approximately 0.3 ppm, very accurate deviation can be obtained. A block actually outputting each control signal only corrects the output timing by referring to the deviation value, and does not affect other operations during the count operation. Therefore, the count operation can be freely performed for a relatively long period of time. Since the count value has a different meaning depending on the reference frequency of the TCXO 11, a cellular phone possesses its own fixed reference frequency.

FIGS. 5A through 5J are timing charts showing the entire intermittent receiving timing control process of a preferred embodiment of the present invention.

As shown in FIG. 5A, received data 60 is intermittently received in a packet format. The received data contains a synchronous signal (SW: synchronization word), and can be synchronized with the transmitted data on the receiving side. A time clock oscillator is always operated, and outputs a first-stage start timing signal based on the counted value of the time clock signal sufficiently before the data are received. Thus, as shown in FIG. 5C, operation of a master clock signal is started. Then, the frequency divider 41 outputs a second-stage start timing signal with an appropriate timing based on the master clock signal by referring to values stored in advance, such as the frequency deviation from the master clock signal of the time clock signal, the phase difference between the time clock signal and the receiving clock signal, etc. Specifically, the frequency divider 41 outputs the second-stage timing signal based on the phase difference time TC after the first-stage timing signal is outputted (See FIG. 5E). An actual operation starts at specific time TO determined according to the hardware configuration after the second-stage start timing signal is outputted. If the actual operation is started, as shown in FIG. 5G, the apparatus enters a receiving enable state, and can receive data 60. If the data 60 are received, and as shown in FIG. 5H, a synchronization detection window is opened based on the master clock signal, synchronization detection can be performed using the synchronous signal of the received data. As shown in FIG. 5I, a receiving clock signal (BTR clock signal) is reproduced from the received data 60. Then, as shown in FIG. 5J, synchronization detection re-timing operation is performed based on the synchronous signal obtained from the received data 60, and a judgment is made as to what counted value of the time clock signal synchronization is completed.

As described above, while data 60 are received and a BTR clock signal is obtained, both the frequency deviation from the master clock signal and the phase difference from the BTR clock signal of the time clock signal are detected, and the deviation and difference are stored in the frequency deviation recording unit 25 and the data/time clock phase difference recording unit 32, respectively. When the reception of the data 60 is completed, the receiving enable state is released, and oscillation of master clock signals is stopped (see FIGS. 5D and 5G). This time receiving enable timing for receiving the next data 60 is determined by generating the next first-stage start timing signal based on the frequency deviation value and phase difference stored in the frequency deviation recording 25 and the data/time clock phase difference recording 32, respectively, and based on the counted value of the time clock signal. In the same way, the data 60 are received, and simultaneously both the frequency deviation from the master clock signal of the time clock signal and the phase difference from the BTR clock signal are recorded in the frequency deviation recording unit 25 and the data/ time clock phase difference recording unit 32, respectively.

FIGS. 6A through 6C are timing charts summarizing the frequency deviation measuring operation described above.

FIG. 6A shows a case where a time clock signal is divided and one pulse is inputted in the counter 40 (FIG. 4) as an enable signal at one second intervals. When the pulse of the enable signal rises, the counter 40 starts counting the input pulses based on a master clock signal. This counting continues until the pulse of the next enable signal falls, and the counter 40 outputs the counted value to the frequency deviation specifying unit 44. The master clock value setting unit 43 (FIG. 4) stores the frequency of the master clock signal. The frequency deviation specifying unit 44 (FIG. 4) specifies the number of pulses of the master clock signal one second of a time clock signal corresponds to, based on the frequency, and determines the frequency deviation (error) of the time clock signal based on the counted value of the pulses of a real master clock signal.

In FIG. 6, a case where a master clock signal is assumed to be 14.4 MHz (FIG. 6B) and a case where a master clock signal is assumed to be 12.6 MHz (FIG. 6C) are shown. If the master clock signal is 14.4 MHz, the count number for one second should be 14400000. In this case, if the real counted value of the counter 40 deviates from this value by $\pm\alpha$, the error of the time clock signal (frequency deviation) is judged to be $\pm\alpha/14400000$. In the same way, if the master clock signal is 12.6 MHz, the count number for one second should be 12600000. In this case, if the real counted value of the counter 40 deviates from this value by $\pm\beta$, the error of the time clock signal (frequency deviation) is judged to be $\pm\beta/12600000$. Then, the error value is recorded in the frequency deviation recording unit 45 FIG. 3).

FIGS. 7A through 7I are timing charts summarizing the correcting method of start timing.

In FIG. 7, a case where the deviation of a time clock signal is +30 ppm and a case where the deviation of a time clock signal is −40 ppm are shown. Counting based on a time clock signal is continued from the previous synchronization detection (FIG. 7A), and if the counted value reaches a specific value, a first-stage start timing signal is outputted. However, if the frequency deviation of the time clock signal is positive, the first-stage start timing signal is outputted from the intermittent start timing generating unit 26 of a clock timer base ahead of the regular clock signal, and if the frequency deviation is negative, the first-stage start timing signal is outputted behind the regular clock signal.

As shown in FIGS. 7D and 7H, a correction made before a second-stage start timing signal is outputted (in actual practice correction is made before each control signal is outputted by this timing signal) is controlled so as to absorb the deviation. In this case, although the measured value of the deviation is referenced, the frequency of the time clock signal is low and thus it is difficult to directly use the value for time division control during intermittent reception.

In order to cope with this situation, in this preferred embodiment, the phase difference between a BTR clock signal, which is synchronized with received data at the time of synchronization detection and a time clock signal, is measured by the time clock phase count storing unit 50 (FIG. 4), and insufficient resolution is compensated for by taking this value into consideration when correction is performed.

Specifically, the second-stage start timing signal is outputted by subtracting the counted value of a master clock signal measured based on a phase difference which is measured based on the counted value assumed when the phases are matched, from the constant used when the deviation is corrected.

FIGS. 8A through 8E explain the measuring method of the phase difference between a time clock signal and a BTR clock (receiving clock) signal.

First, synchronization detection is performed, and this matches the rise in a receiving clock (BTR clock) signal with high accuracy (see FIGS. 8A and 8B). Then, a synchronization judging unit 51 makes the time clock phase count storing unit 50 start counting the pulses of a master clock signal in synchronization with the synchronization detection, and on the rising edge of the first time clock signal after the count makes the time clock phase count storing unit 50 stop counting the pulses of the master clock signal (see FIGS. 8B, 8C and 8E). In this way, the time clock phase count storing unit 50 obtains and stores the phase difference between the receiving clock signal and the time clock signal as the counted value of the number of pulses of the master clock signal.

After synchronization is established, the interval between the rising edge of a BTR clock signal and the rising edge of a time clock signal is counted by a master clock signal from the TCXO 11, and the rise of the first BTR clock signal after the establishment of synchronization is guaranteed with a high degree of accuracy, thus solving the insufficient resolution problem of a time clock signal (see FIGS. 8A–8D). When phase difference measurement starts (that is, when synchronization is established), the counter of the time clock base, that is, the counted value of the time clock phase count storing unit 50 is reset to prevent deviations from being accumulated. In this way, intermittent reception can be performed with conventional timing.

The present invention has the secondary effect of improving the apparent accuracy of the clock timer 28 utilizing information about the measured deviation of the time clock signal.

FIGS. 9A through 9D are timing charts showing a method for improving the apparent accuracy of the clock timer 28.

A mechanism for inserting and deleting a time clock signal (1 second) is provided (See FIGS. 9A and 9B), and operation correction can be realized by controlling the time at which a time clock signal pulse in units of several hours (several days) is inserted or deleted using the measured deviation (see FIGS. 9C and 9D). A configuration in which a time clock signal is inserted and deleted by one pulse or a predetermined number of pulses shall be considered by one skilled in the art as the situation requires.

As a specific example, if the deviation is approximately +10 ppm, the time clock signal advances by one second about every 28 hours, and if the deviation is approximately −20 ppm, the time clock signal falls by one second about every 14 hours. In the former case, a time clock signal has one pulse deleted every 14 hours, as shown in FIG. 9B. In the latter case, a time clock signal has one pulse inserted every 14 hours, as shown in FIG. 9A. In this case, for the referenced deviation, the first deviation measured after the power is turned on is used to avoid being influenced by the temperature change of a cellular phone.

Even if the clock timer 28 is operated with inappropriate timing over the short term, the clock timer 28 can be restored to a normal state by updating the correction value described above in synchronization with the insertion/deletion process of the time clock signal described above at a predetermined time. As far as the correcting function of the clock timer 28 is concerned, deviation can be measured at the time of factory shipment at room temperature using a special command, and the measured value can be stored in a non-volatile memory as peculiar terminal information.

In this case too, the deviation must be measured when an AFC 12 is started. Moreover, the control proposed in this preferred embodiment can be applied to other clock sources. FIG. 3 shows an example application to the master clock signal of a modem. Since in this example, predicted deviation can be taken into consideration in BTR operation, the control is effective for the storage of transmitting timing in the case where there are no signals to be received, etc.

Figure 10:
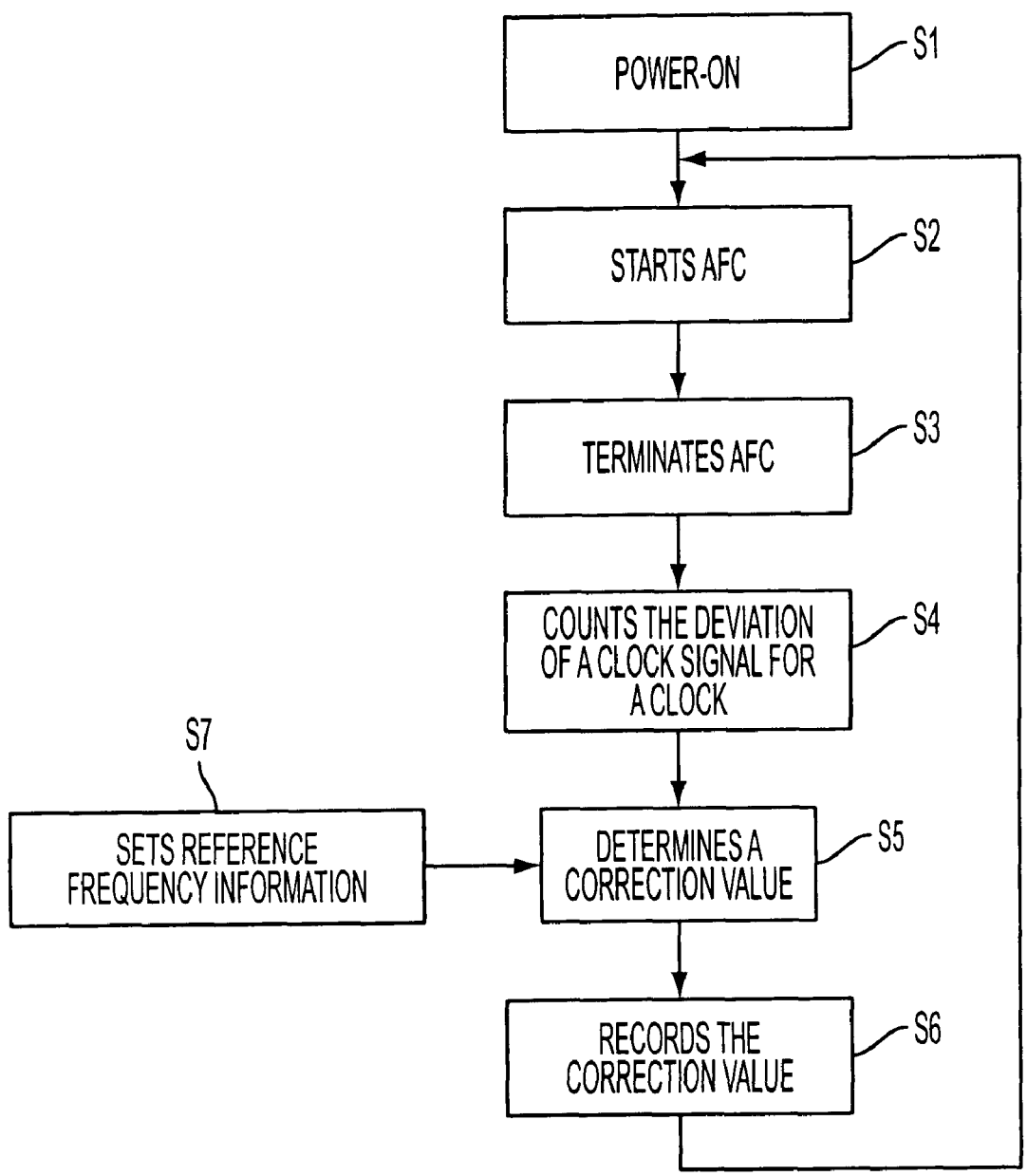
FIG. 10 is a flowchart showing a clock deviation measuring operation.

FIG. 10 is a flowchart showing the time clock deviation measuring operation of this preferred embodiment.

First, in step S1, the power is turned on. Then, in step S2, the AFC 12 is started. In step S3, the operation of the AFC 12 is completed, and if the oscillating frequency of a master clock signal outputted from the AFC 12 is stabilized, in step S4, the frequency deviation of a time clock signal is counted by the frequency deviation detecting circuit 23. In step S5, a reference frequency information setting value (the frequency value of the master clock signal), which is set in the master clock value setting unit 43 by the frequency deviation specifying unit 44 in step S7, is referenced and a correction value to be used to correct the deviation of the time clock signal is determined. Then, in step S6, the correction value is recorded in the frequency deviation recording unit 45, and the flow returns to step S2.

Figure 11:
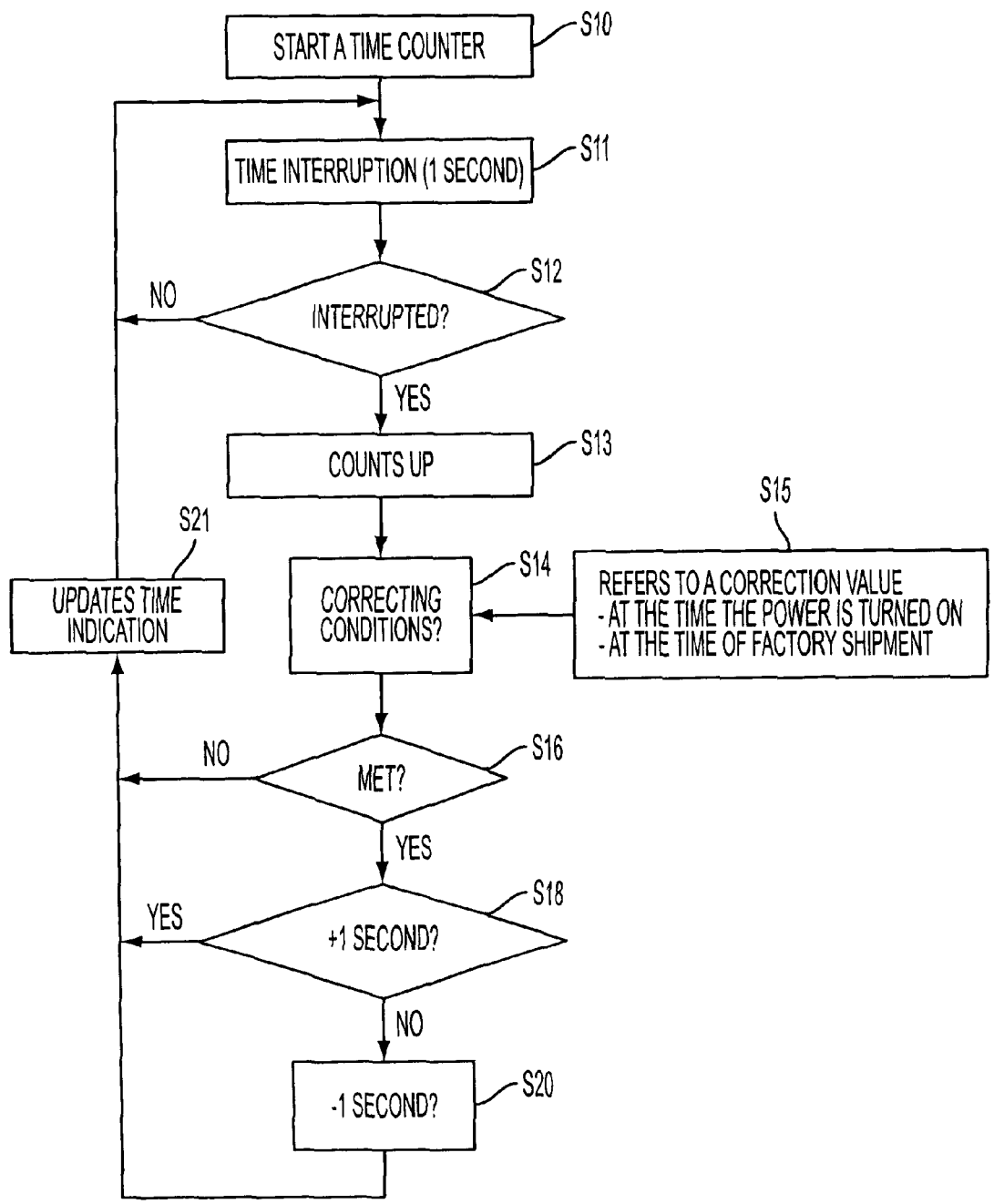
FIG. 11 is a flowchart showing a time clock correcting operation.

FIG. 11 is a flowchart showing a clock timer correcting operation.

First, in step S10, the time counter 28 is started. In step S11, it is checked whether interruption occurs in the time counter 28. In this case, it is assumed that an interruption is made in one second. In step S12, as a result, it is judged whether an interruption is made. If in step S12, it is judged that no interruption is made (NO in S12), the flow returns to step S11 and the judgment in step S12 is repeated. If it is judged that an interruption is made (YES in S12), in step S13, the count of a counter (not shown in FIG. 11) is started. In step S14, it is checked whether the correcting conditions of a time clock signal are met. At this moment, the correction value set at the time the power is turned on or at the time of factory shipment is referenced (step S15). In step S16, it is judged whether the correcting conditions are met. If the correcting conditions are not met (NO in S16), in step S21, time indication is updated (that is, time indication is advanced). In this case, no correction is performed and the flow returns to set S11. If it is judged that the correcting conditions are met (YES in S16), in step S18, it is judged whether the correction value is +1 second. If it is judged that the correction value is +1 second (YES in S18), in step S21, the time indication is updated (the value of time indication, that is, one second is ignored in time indication), and the flow returns to step S11. If in step S18, it is judged that the correction value is not +1 second (NO in S18), in step S20 it is judged that the correction value is −1 second. If in step S20, it is judged that the correction value is −1 second, in step S21 the time indication is updated (after the same second is displayed twice, time indication is restored to the normal state), and the flow returns to step S11.

In this case, correcting conditions in step S14 are conditions for timing with which the time of the clock timer 28 is corrected and the correction value, showing, for example, that time indication is corrected by +1 second or −1 second at predetermined time intervals of once every 20 hours or once every 30 hours.

Figure 12:
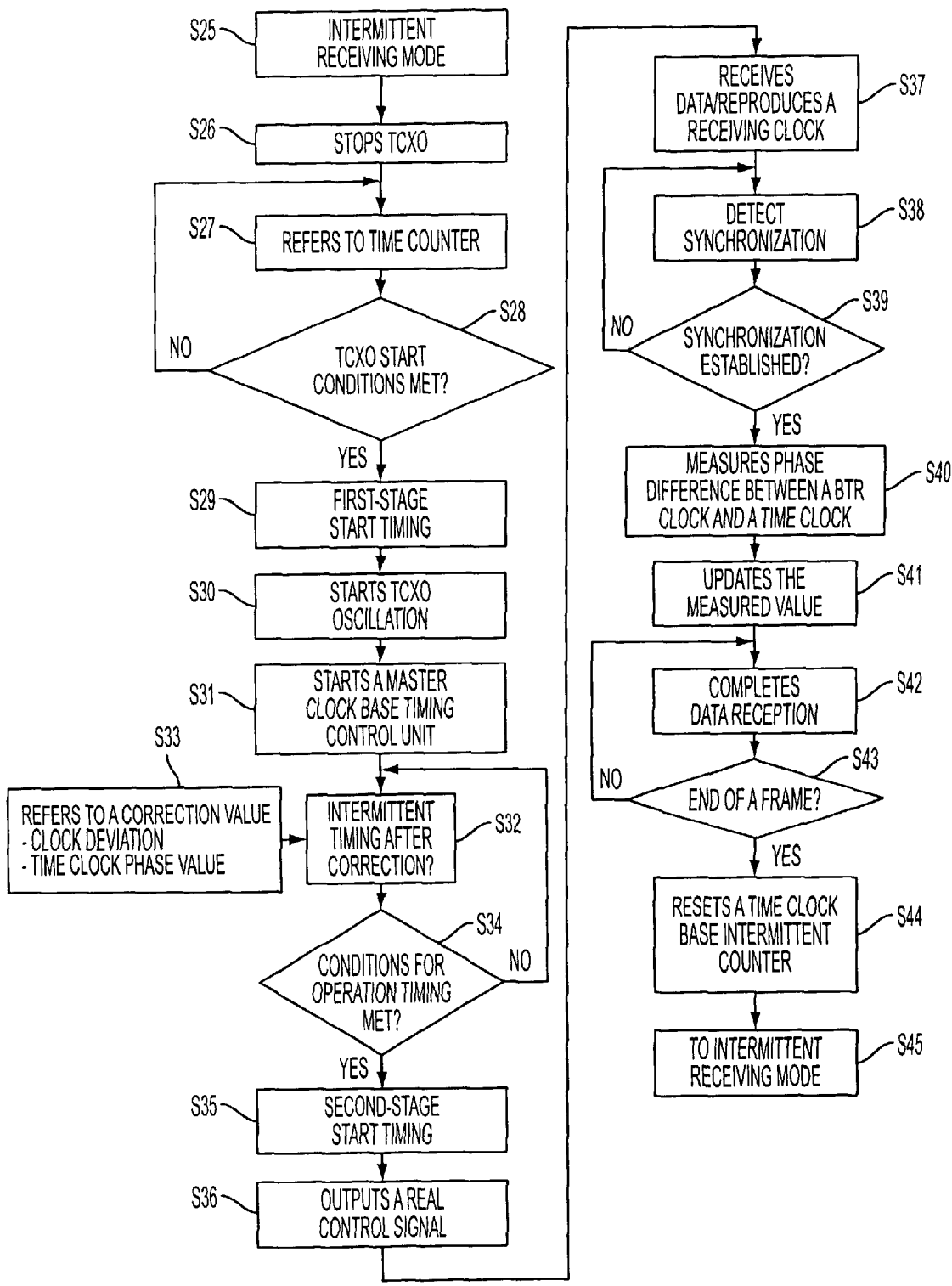
FIG. 12 is a flowchart showing the operation of intermittent reception.

FIG. 12 is a flowchart showing an intermittent receiving operation.

First, in step S25, the apparatus enters an intermittent receiving mode. In step S26, the TCXO 11 is stopped, and in step S27, the pulse counted value of a time clock signal is referenced. In step S28, it is judged whether the starting conditions of the TCXO 11 are met, based o n the count ed value. Specifically, it is judged whether the time when the next data packet is transmitted is near. If it is judged that the time is not near (NO in S28), the flow returns to step S27 and the processes described above is repeated until the starting conditions of the TCXO 11 are met. If in step S28, the starting conditions of the TCXO 11 are met (YES in S28), in step S29, the intermittent start timing generating unit 26 outputs a first-stage start timing signal to the intermittent timing monitoring unit 21, and in step S30, the intermittent timing monitoring unit 21 starts the TCXO 11 via the oscillation control unit 22. In step S31, the timing control unit 47 of a master clock base is started, and in step S32, the timing control unit 47 determines intermittent timing after correction. At this moment, in step S33, the timing control unit 47 refers to correction values, such as the frequency deviation value of the time clock signal, the phase difference of the time clock signal, etc.

In step S34, the timing control unit 47 judges whether an operation timing signal synchronous with an intermittent timing signal after correction arrives. If it is judged that it is not presently time for operation (NO in S34), the flow returns to step S32. If in step S34, it is judged that it is presently time for starting operation (YES in S34), in step S35 the timing control unit 47 outputs a second-stage start timing signal to the intermittent timing controller 48, and in step S36, the intermittent timing controller 48 outputs a real control signal from the wireless processing unit 16 to a baseband signal processing unit 20.

Then, in step S37, the synchronization judging unit 51 receives data, and reproduces a BTR clock (receiving clock) signal. In step S38, the synchronization judging unit 51 performs synchronization detection using the synchronous signal of the received data, and in step S39, the synchronization judging unit 51 judges whether synchronization is established. If no synchronization is established (NO in S39), the flow returns to step S38, and the processes in step S38 and S39 are repeated until synchronization is established. If in step S39, it is judged that synchronization is established (YES in S39), in step S40 the phase difference between the BTR clock signal and clock timer clock signal is measured by both the time clock phase trigger generating unit 49 and time clock phase count storing unit 50, and in step S41 the measured value of the phase difference is updated. In step S42, it is checked whether data reception is completed, and in step S43 it is judged whether data reception is completed (the end of the frame is detected). If data reception is not completed (NO in S43), the flow returns to step S42, and the processes are repeated. If in step S43, it is judged that data reception is completed (YES in S43), in step S44 the counted value for the intermittent reception of a timer clock base stored in the time clock phase count storing unit 50 is reset, and in step S45 the flow returns to the starting point (step S25) of the intermittent receiving mode.

FIGS. 13A through 13C compare and explain the consumption current in a conventional clock configuration and this preferred embodiment.

FIG. 13A shows a conventional method where a dedicated clock source is separately provided in order to stop a TCXO. FIG. 13B shows a prior art in which the TCXO is always operated. FIG. 13C shows the case of this preferred embodiment.

In FIG. 13, the meaning of each symbol is as follows.

Irx: Consumption current during intermittent reception.
Ipr: Consumption current in a preparation stage prior to actual receiving operation.
Iclk: Consumption current during non-reception in the case where a dedicated clock source is provided.
Itcxo: Consumption current during non-reception in the case where a clock signal from a TCXO is used as a base.
Iclock timer: Consumption current during non-reception in the case where a clock signal from the time clock oscillator 24 is used. The clock timer 28 operates at all timings, and the consumption current includes the consumption current of all clock timers 28.
T receiving: Receiving time.
T intermittent 1: Receiving time in a conventional system (system in which the TCXO shown in FIG. 13A is always operated).
T intermittent 2: Receiving time in this preferred embodiment.
T intermittent 3: Receiving time in a conventional system (system in which the dedicated clock source shown in FIG. 13B is provided and the TCXO is stopped).
Tpr 1: Receiving preparation time in a conventional system (system using a TCXO).
Tpr 2: Receiving preparation time in this preferred embodiment.
Tosc: Time required to stabilize TCXO oscillation.
T: Intermittent receiving standby time,
where in the conventional system shown in FIG. 13B, T=T intermittent 1+Tpr 1, and in this preferred embodiment shown in FIG. 13C, T=T intermittent 2+Tosc.

Generally, in intermittent reception the consumption current during non-reception dominates and the consumption current during receiving standby is obtained by period-integrating consumption current x operation time by one cycle, since T intermittent is extraordinarily long.

A performance comparison between the systems using a PDC is given as an example below.

(To simplify the description, common items, such as software operation, etc., are omitted.)

Irx: 80 mA

Ipr: 20 mA

Iclk: 1 mA

Itcxo: 2 mA

Iclock timer: 0.1 mA

Icom (current common to all systems): 1.0 mA

T receiving: 6.6 ms

T intermittent 1: 712.4 ms

T intermittent 2: 708.4 ms

T intermittent 3: 709.4 ms

Tpr 1: 1 ms

Tpr 2: 2 ms (including correcting operation)

Tosc: 3 ms

T: 720 ms

The consumption current of this preferred embodiment is obtained by using the following equation (1).

$$Itotal=1/T\{Itcxo \times Tosc + Irx \times T\text{ receiving} + Ipr \times Tpr2 + (Icom + Iclock\text{ timer}) \times T\text{ intermittent 2}\} \quad (1)$$

The consumption current is evaluated as follows.

Itotal (the conventional dedicated clock system shown in FIG. 13A)=2.75 mA (220H)

Itotal (the conventional TCXO system shown in FIG. 13B)=3.74 mA (160H)

Itotal (this preferred embodiment shown in FIG. 13C)= 1.90 mA (310H), where parenthesized time is receiving standby time for the case where a general battery (600 mAH) is used.

Although real receiving standby time depends on current consumed in operations other than the operations described above, according to this preferred embodiment, receiving standby time in a digital cellular phone can be greatly increased.

According to this preferred embodiment, in a cellular phone, during normal communications a baseband (BB) signal process is performed based on a clock signal from a high-accuracy reference frequency oscillator. Therefore, during receiving standby the consumption current can be greatly reduced by generating intermittent signals based on a clock signal of a clock timer while maintaining high performance in the BB signal process.

Moreover, according to another aspect of this preferred embodiment, the accuracy of the clock of a cellular phone can be greatly improved without individual adjustment by measuring the deviation of a time clock signal and controlling the operation of a clock timer using the measured value of the deviation.

Moreover, since the number of clock components can be reduced, cost reduction, light weight and small size can be realized.

What is claimed is:

1. A receiving control apparatus comprising:

reference frequency oscillator generating a high-accuracy first clock signal;

time clock oscillator generating a second clock signal which has a lower accuracy than the clock signal generated by the reference frequency oscillator, with smaller power consumption than the reference frequency oscillator;

receiver receiving transmitted signals;

controller controlling the apparatus, during normal communications so as to drive the receiver and to receive signals based on the first clock signal generated by the reference frequency oscillator, during receiving standby so as to stop the reference frequency oscillator and to manage/control intermittent receiving timing based on the second clock signal generated by the time clock oscillator, when the apparatus shifts from a receiving standby state to a communications state, so as to start the reference frequency oscillator based on the second clock signal generated by the time clock oscillator and after an operation of the reference frequency oscillator is stabilized so as to start reception of signals using the receiver;

frequency deviation detector, after the operation of said reference frequency oscillator is stabilized, detecting frequency deviation against the first clock signal of the second clock signal generated by the time clock oscillator by counting a number of pulses of the first clock signal generated by said reference frequency oscillator in one cycle of a divided clock signal of the second clock signal generated by said time clock oscillator; and storage storing a frequency deviation value detected by the frequency deviation detector as data, wherein said controller corrects timing for starting said reference frequency oscillator based on the data stored in the storage.

2. The receiving control apparatus according to claim 1, which inserts and deletes a clock pulse for said time clock oscillator generated based on the second clock signal generated by said time clock oscillator at predetermined time intervals based on the data stored in said storage, and corrects a deviation in time indication generated by a counting signal of said time clock oscillator.

3. The receiving control apparatus according to claim 1, further comprising receiving clock oscillator reproducing a receiving clock signal from received data, wherein when starting said reference frequency oscillator, said controller specifies a phase difference between the receiving clock signal and the second clock signal generated by said time clock oscillator, and controls timing for starting said reference frequency oscillator based on both the phase difference and the data stored in said storage.

4. A receiving control method, comprising the steps of:

(a) generating a first high-accuracy clock signal;

(b) generating a second clock signal which has a lower accuracy than the clock signal generated in step (a), with smaller power consumption than that used in step (a);

(c) receiving transmitted signals;

(d) controlling an apparatus, during normal communications so as to receive signals in step (c) based on the first clock signal generated in step (a), during receiving standby so as to stop generation of clock signals in step (a) and to manage/control intermittent receiving timing based on the second clock signal generated in step (b), when the apparatus shifts from a receiving standby state to a communications state, so as to start a process in step (a) based on the second clock signal generated in step (b) and after an operation in step (a) is stabilized so as to start reception of signals in step (c);

(e) detecting frequency deviation, after the operation in step (a) is stabilized, from the first clock signal of the second clock signal generated in step (b) by counting a number of pulses of the first clock signal generated in step (a) in one cycle of a divided clock signal of the second clock signal generated in step (b); and (f) storing a frequency deviation value detected in step (e) as data, wherein step (d) corrects timing for starting the process of step (a) based on the data stored in step (f).

5. The receiving control method according to claim 4, which inserts and deletes a clock pulse for said time clock oscillator generated based on the second clock signal generated in step (b) at predetermined time intervals based on the data stored in step (f), and corrects deviation in time indication generated by a counting signal generated in step (b).

6. The receiving control method according to claim 4, further comprising the step of (g) reproducing a receiving clock signal from received data, wherein when starting the process in step (a), step (c) specifies a phase difference between the receiving clock signal and the second clock signal generated in step (b), and controls timing for starting the process in step (a) based on both the phase difference and the data stored in step (f).

* * * * *